O. ALLEN, Jr.
NUT LOCK.
APPLICATION FILED OCT. 20, 1911.

1,036,949.

Patented Aug. 27, 1912.

WITNESSES

INVENTOR
Oglesby Allen Jr

UNITED STATES PATENT OFFICE.

OGLESBY ALLEN, JR., OF CHICAGO, ILLINOIS, ASSIGNOR TO ALLEN'S NUT LOCK COMPANY, LIMITED, A CORPORATION OF LOUISIANA.

NUT-LOCK.

1,036,949.  Specification of Letters Patent.  Patented Aug. 27, 1912.

Application filed October 20, 1911.  Serial No. 655,776.

*To all whom it may concern:*

Be it known that I, OGLESBY ALLEN, Jr., citizen of the United States of America, residing at Chicago, in the county of Cook and State of Illinois, have invented certain new and useful Improvements in Nut-Locks, of which the following is a specification, reference being had therein to the accompanying drawing.

This invention relates to nut locks and has as its object to provide a nut lock which will be inexpensive to manufacture, capable of being manipulated to lock a nut in place without the use of any tool other than the wrench employed in turning the nut upon its bolt, and in which the locking pawls will be concealed and so housed that they cannot be disengaged from the bolt by the insertion of a wire or sharp pointed instrument.

For a full understanding of the invention reference is to be had to the following description and accompanying drawing, in which:—

Figure 1:
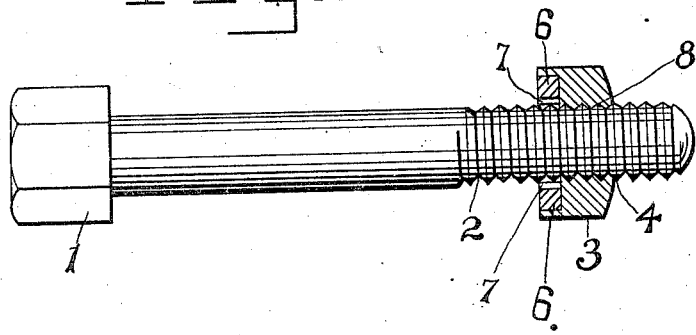
Figure 2:
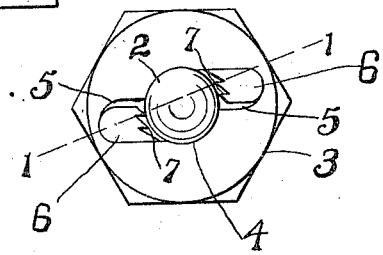
Figure 3:
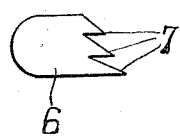
Figure 4:

Figure 1 is a view partly in elevation and partly in section of the nut locking device embodying the present invention. Fig. 2 is a bottom plan view of the nut. Fig. 3 is a side elevation of one of the locking pawls. Fig. 4 is a similar view of the other pawl.

Corresponding and like parts are referred to in the following description and indicated in all the views of the accompanying drawing by the same reference characters.

In the drawing the numeral 1 indicates the head of the bolt and 2 the threaded shank thereof.

The nut which is threaded upon the bolt is indicated at 3 and its bolt-receiving opening at 4. The rear face of the nut, or in other words that face which is to bear against the part to be secured, is formed with recesses 5 which open solely at the said face and communicate with the bolt-opening in the nut. These recesses are located at opposite sides of the bolt-opening as will be observed from inspection of Fig. 2 of the drawings and in each of the recesses is seated one of the locking pawls forming a part of the device. Each of the locking pawls comprises a flat-sided body 6 and at one end is formed with teeth 7, the opposite end being rounded so that the pawls may have rocking movement against the outer walls of the recesses 5. The pawls are disposed within the recess 5 in reverse relation as shown in Fig. 2 and after being so arranged the nut is to be screwed upon the bolt until it bears firmly against the element to be secured. It is then given a slight turn backward which will result in the teeth 7 biting into the threads of the bolt, the nut being in this manner locked against further backward rotation. It will be observed that the pawls are completely housed within the nut inasmuch as the recesses do not open through the sides of the nut and they are closed at their open sides by the face of the element which is secured by the nut and bolt, and for this reason the pawls cannot be disengaged from the bolt.

From inspection of the drawings it will be observed that the shorter wall of each recess is located in a plane which is substantially radial with respect to the axis of the bolt opening of the nut and that the longer or opposite side wall of each recess is located in a plane parallel to the plane of the first-mentioned wall and substantially tangential with respect to the wall of the said bolt opening. It will also be observed that each pawl has a relatively long and a relatively short side and that these sides are parallel and are presented respectively toward the last and first named walls of the recess within which the pawl is disposed. Further, it will be noted that the end of the pawl which is presented at the bolt opening in the nut is formed with a number of teeth and that these teeth increase in length from the short side of the pawl to the long side thereof, and that the shortest tooth of each pawl is initially in engagement with the thread of the bolt upon which the nut is fitted, the intermediate tooth and the longest tooth being out of engagement with the bolt thread. It will be understood, however, that upon reverse rotation of the nut or bolt, the slight engagement of the shortest tooth with the bolt thread will result in a canting of the pawl to such an extent as to bring its next longest or intermediate tooth into biting engagement with the bolt thread, and this tooth being longer than the first-mentioned tooth and having its biting end located a greater distance from the axis of the pawl, will more firmly dig into the bolt thread thereby finally insuring of a positive canting of the pawl and a positive biting of the longest tooth deep into the bolt thread.

It will be apparent that I have not provided a plurality of teeth upon each pawl for the purpose of securing a cumulative gripping effect, but have provided a plural number of teeth for the purpose of insuring a rotation or canting of each pawl to such a degree as to bring its true locking tooth into firm and positive engagement with the bolt thread.

Having thus described the invention what is claimed as new is:—

1. A lock nut having a bolt opening and formed in one face with a recess in communication with the bolt opening, one wall of the recess lying in a plane radial with respect to the axis of the bolt opening and the opposite wall lying in a plane substantially parallel to the plane of the first mentioned wall and substantially tangential to the wall of the said bolt opening, and a locking pawl disposed with the recess and having parallel short and long sides presented respectively toward the first and last mentioned walls of the recess, the pawl having an end presented at the wall of the bolt opening and formed with a series of teeth increasing in length in order from the short to the long side of the pawl and arranged to engage successively, in the order stated, with the thread of a bolt fitting in the opening of the nut upon reverse rotation of the nut or bolt, whereby the pawl will be canted to cause its longer tooth to bite into the bolt thread.

2. A locking nut formed in one face with recesses located at opposite sides of its bolt opening, non-corresponding walls of the recesses being located substantially in a plane intersecting the axis of the bolt opening and their other non-corresponding walls being in planes located at opposite sides of the first-mentioned plane, and a pawl loosely arranged within each of the recesses, each pawl having a plurality of thread engaging teeth at its end which is presented at the bolt opening, the teeth increasing in length from that one which is located adjacent the first-mentioned wall of the recess to that one which is located adjacent the last-mentioned wall of the recess respectively, and the shorter teeth of each pawl being arranged to grip and successively engage the thread of a bolt threaded into the bolt opening, whereby upon a rotation of the bolt the pawls will be canted to cause their longer teeth to bite into the bolt thread.

In testimony whereof I affix my signature in presence of two witnesses.

OGLESBY ALLEN, Jr.

Witnesses:
L. M. JONES,
H. W. WINCHESTER.

---

Copies of this patent may be obtained for five cents each, by addressing the "Commissioner of Patents, Washington, D. C."